Sept. 9, 1941.   A. M. MORRIS   2,255,448
DUST COLLECTING APPARATUS
Filed Dec. 23, 1939
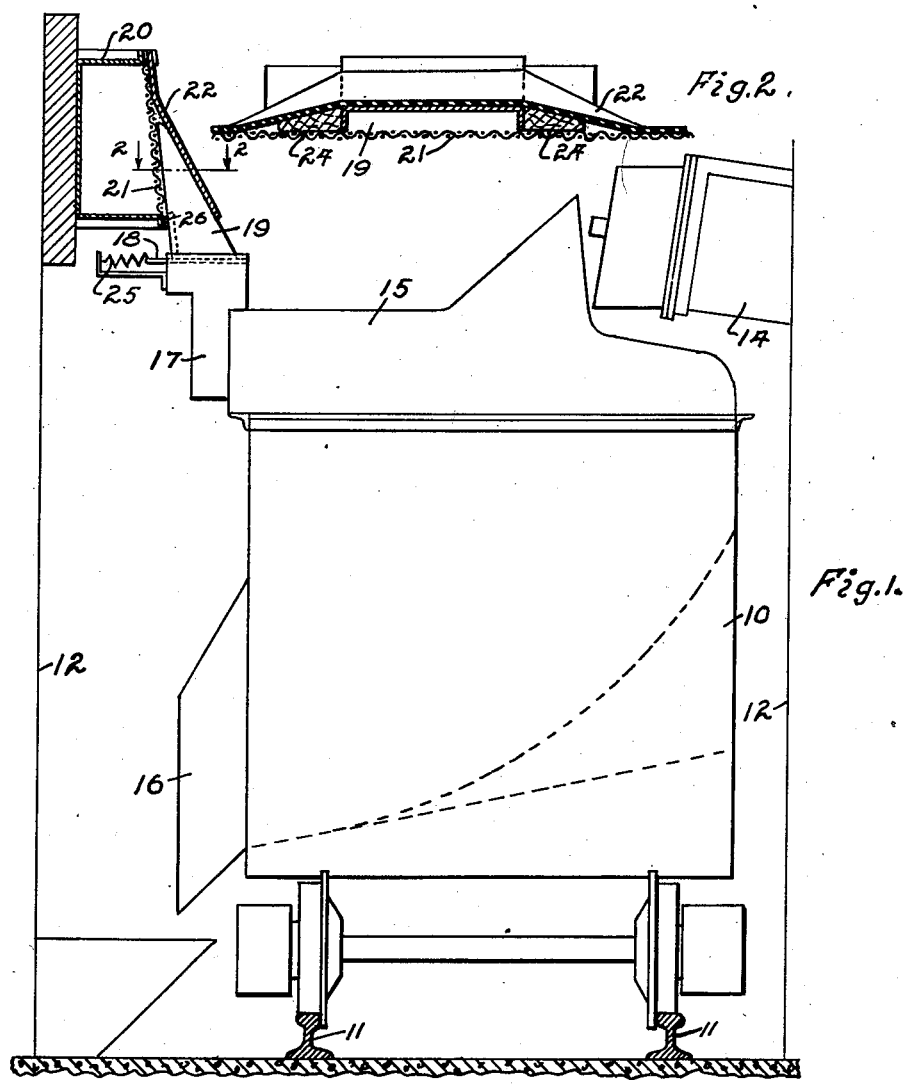
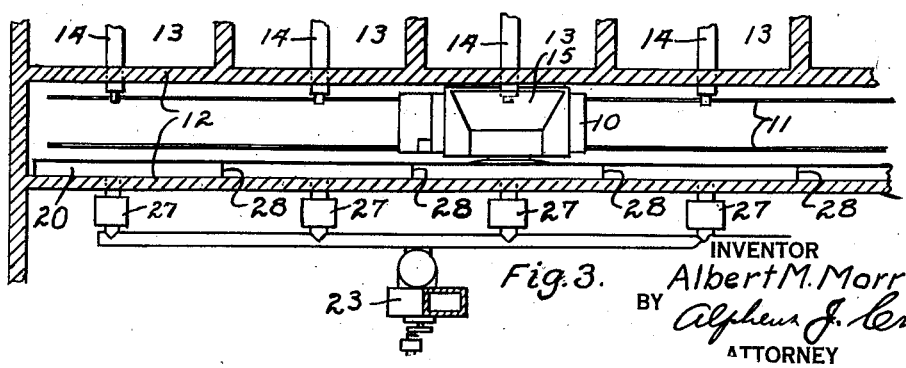
INVENTOR
Albert M. Morris Patented Sept. 9, 1941

2,255,448

UNITED STATES PATENT OFFICE 2,255,448

DUST COLLECTING APPARATUS

Albert M. Morris, Barberton, Ohio, assignor to The Ohio Brass Company, Mansfield, Ohio, a corporation of New Jersey Application December 23, 1939, Serial No. 310,709

14 Claims. (Cl. 214—41)

This invention relates to dust collecting apparatus particularly adapted for use in connection with traveling receptacles, such as mixing cars, used in making up a batch of material having a number of ingredients therein.

One object of the invention is to provide dust collecting apparatus which shall be continuously in communication with the traveling receptacle.

Another object of the invention is to provide dust collecting apparatus which shall be economical to install, which shall be automatic in operation and which shall be efficient in the collection of dust which would ctherwise contaminate the atmosphere.

Other objects and advantages will appear from the following description.

The invention is exemplified by the combination and arrangement of parts shown in the accompanying drawing and described in the following specification and it is more particularly pointed out in the appended claims.

In the drawing:

Fig. 1 is a cross section of a runway having the present invention applied thereto and showing a mixing car in elevation and in operative connection with the invention.

Fig. 2 is a section on line 2—2 of Fig. 1.

Fig. 3 is a horizontal section of the runway shown in Fig. 1 but on a much smaller scale and showing the mixing car and dust collecting conduit in top plan.

In many industries it is necessary to mix up batches having various ingredients, some or all of which may be dusty in their nature, so that if some provision is not made for preventing the dust from contaminating the atmosphere, the workmen will be subjected to this dust which is not only disagreeable, but in some cases, may be detrimental to the health of the workmen. It is common practice to store material to be mixed in a series of bins arranged side by side along a runway and to provide a traveling car in the runway into which the desired proportions of a particular charge are discharged from the bins, the car being moved from one bin to another to receive its portion from each bin. The material is discharged into the car either by conveyors or by chutes so that when it falls into the car, if any dust is present, it will rise into the atmosphere within the runway and about the car.

The present invention provides a suction conduit along the runway and means for connecting this conduit with a canopy or hood disposed over the car so that any dust arising from the car or discharge chute will be drawn from the hood into the conduit, thus preventing it from entering the atmosphere surrounding the car. The embodiment of the invention shown in the drawing is particularly applicable to the mixing of clay and other materials used in the manufacture of porcelain, but it will be understood that the invention is not restircted to this particular embodiment.

In the drawing the numeral 10 designates a mixing car arranged to travel along track rails 11 disposed in a runway having side walls 12. A series of bins 13 are disposed at one side of the runway in which the various materials are stored and chutes or conveyors 14 are provided for conveying the material from the bins to a position where it may be discharged into the car 10. The upper part of the car is provided with a hood or canopy 15 which covers the major portion of the top of the car, but which is provided with an opening at one side, as clearly shown in Fig. 1, through which the conveyor 14 discharges into the car. The car is provided with a discharge chute 16 at the side opposite the intake opening, which discharge chute is provided with a suitable closure under control of the operator so that the material may be discharged after a batch has been made up from the desired proportions from the various bins. Mounted at the top of the car on the side opposite the intake opening and communicating with the interior of the canopy is a suction box 17 closed at its top by a slide 18 on which is mounted a suction head 19 communicating through the slide 18 with the interior of the box 17. The upper part of the suction head 19 is closed on three sides, as shown in Fig. 2, but has its fourth side open and disposed against the outer side of a suction conduit 20 mounted on the wall 12 of the runway and extending along the runway the full length of the path of travel of the car 10. The outer face of the conduit 20 is covered by a screen 21 and overlying this screen is a flexible curtain 22 which closes the outer side of the conduit throughout the entire length thereof, except for that portion communicating with the suction head 19. The curtain 22 is secured at its upper edge to the upper edge of the conduit and hangs freely so as to lie against the outer surface of the screen 21 and provide a tight closure for the outer face of the conduit.

As shown in Fig. 1, the suction head 19 is tapered at its upper end and projects between the screen 21 and the apron 22 so that the open face of the suction head communicates with the interior of the conduit through the screen 21, Throughout the length of the conduit the screen provides a backing or stop for the curtain which prevents the curtain from being drawn into the conduit and the suction within the conduit holds the curtain tightly against the outer face of the screen. However, the suction head 19 holds the portion of the curtain in registration with the suction head away from the screen so as to provide communication between the conduit and the suction head, the curtain at each side of the suction head being drawn inwardly against the screen so as effectively to close the screen at each side of the suction head. It is not essential that a complete seal be provided at each side of the suction head as sufficient fan capacity is provided to maintain reduced pressure inside the conduit notwithstanding considerable ingress of air at the edges of the suction head. Any suitable fan mechanism indicated at 23 may be provided for maintaining a partial vacuum within the conduit 20. Wedge-shaped approach blocks 24 are secured to the lateral faces of the suction head 19 to provide an inclined approach to the suction head for the curtain 22, as shown best in Fig. 2. These blocks are tapered vertically to conform to the taper of the suction head 19, and are also tapered laterally to provide the inclined approach for the curtain. It will be seen that as the car 10 moves along the track 11 the suction head 19, with its approach blocks 24 will nose its way along between the curtain 22 and the screen 21 so that communication is maintained at all times between the suction head and the conduit, and this will produce a draft of air through the canopy 12 and into the conduit 20 so that any dust arising from the material in the car or from the material being discharged from the conveyors 14 will be drawn through the canopy and into the conduit 20 and will be discharged through the fan mechanism into any desired collector so as to prevent contamination of the atmosphere where the workmen are occupied.

A spring 25 is attached to the slide 18 on which the head 19 is mounted so that the head is continuously drawn into resilient engagement with the outer face of the conduit. This will compensate for any irregularities in the mounting for the conduit and any lateral play of the car due to unevenness of the track so that effective connection between the conduit and the suction head will be maintained at all times. A wear strip 26 is preferably provided along the lower edge of the conduit to engage the face of the suction head 19. The curtain 22 may be made of rubber or suitably treated fabric sufficiently flexible to permit the slight outward displacement to accommodate the suction head 19 and sufficiently impervious to the passage of air so as to maintain the suction within the conduit 20.

If it is desired to recover the material drawn off in the form of dust, this may be done by providing interceptors or dust collectors 27 interposed between the conduit 20 and the fan 23. In order to prevent the dust from the various bins from being mixed, the conduit 20 may be divided by partition walls 28 separating the conduit into sections, one section being disposed opposite each of the bins 13. A collector 27 is provided for each of the conduit sections so that the material from only one of the bins will be directed into each collector, thus keeping the various materials separated. The suction for each of the collectors may be provided by connecting the collectors all to a single fan 23 or separator fans may be provided for each collector, if desired.

I claim:

1. The combination with traveling apparatus, of means for collecting floatage in the atmosphere arising from within said apparatus, said means comprising a conduit extending along the path of travel of said apparatus, means for exhausting air from said conduit to maintain a partial vacuum therein, means for closing said conduit at all sides thereof to the outer atmosphere and means connected with said apparatus at the upper portion thereof and having traveling connection with said conduit for displacing said closing means at one side of said conduit adjacent said apparatus and connecting said apparatus with said conduit to facilitate entrance into said conduit of floatage from the upper portion of said apparatus.

2. The combination with traveling apparatus, of a conduit extending along the path of travel of said apparatus, a continuous curtain closing one side of said conduit, the other sides of said conduit being all tightly closed, a suction head connected with said apparatus and extending beneath said curtain to provide communication between said conduit and said apparatus and means for exhausting air from said conduit to provide a partial vacuum therein and to draw said continuous curtain about said suction head and create a current through said head.

3. The combination with traveling apparatus, of a conduit extending along the path of travel of said apparatus, a flexible closure for one side of said conduit, the other sides of said conduit being all tightly closed and a head connected with said apparatus and arranged to travel with said apparatus and to displace said flexible closure against pressure of the atmosphere thereon at positions along said conduit to provide communication with the interior of said conduit, said flexible closure being continuous throughout the path of travel of said head to avoid breaks in the closure for said conduit at the sides of said head as said head travels along said conduit.

4. The combination with a plurality of storage bins, of a runway disposed adjacent said bins, a car arranged to travel along said runway, means for discharging material from each of said bins into said car, a conduit disposed adjacent the path of travel of said car, means for exhausting air from said conduit to provide a partial vacuum therein and means mounted on said car to travel therewith and having traveling communication with said conduit to facilitate removal through said conduit of dust arising from the material discharged into said car for all positions of said car.

5. The combination with a plurality of storage bins of a runway disposed adjacent said bins, a car arranged to travel along said runway, means for transferring material between said car and bins, a conduit extending along said runway separate from said bins, means for exhausting air from said conduit to provide a partial vacuum therein, a suction head mounted on said car and having traveling connection with the interior of said conduit and means for closing said conduit at all sides thereof against communication with the atmosphere, said closing means being displaceable at one side of said conduit to facilitate communication with the interior of said conduit adjacent said car.

6. The combination with a conduit, of means for exhausting air from the interior of said conduit, a flexible closure for one side of said conduit, a foraminated stop for said flexible closure and means extending between said closure and stop and arranged to travel along said conduit for establishing communication with the interior of said conduit.

7. The combination with a conduit having a flexible closure for one side thereof, a foraminated stop for said closure, a head extending between said closure and stop and communicating through said stop with the interior of said conduit and a tapered approach member at the side of said head for facilitating travel of said head along said conduit between said closure and stop.

8. The combination with a conduit, having a foraminated side wall, of a flexible curtain overlying said side wall and having one edge thereof detached from said conduit, a suction head extending between said curtain and side wall at the detached edge of said curtain, said head being movable along said conduit between said side wall and curtain to provide communication with said conduit through said side wall and head while said curtain effectively closes said conduit to the outer atmosphere, inclined approaches at each side of said head to facilitate the fit of said curtain about said head, and resilient means for holding said head against said side wall.

9. The combination with a plurality of bins for different materials to be mixed, of a traveling receptacle for receiving material from said bins, a suction conduit disposed adjacent said bins, means for connecting said receptacle with said conduit at various positions along said conduit, said conduit having sections thereof corresponding to said bins respectively and separated from one another to keep the materials collected by said conduit from the different bins separated, exhaust mechanism for said conduit and a dust collector for each of said conduit sections connected with said exhaust mechanism.

10. The combination with a plurality of bins for different materials, of a runway adjacent said bins, a mixing car arranged to travel along said runway and having a receiving opening therein arranged to be brought selectively into receiving relation with said respective bins, a suction conduit extending along said runway, said conduit being divided into sections, one section corresponding to each of said bins, means for separately connecting each of said sections with said car at the time said car is in position to receive material from the corresponding bin, to exhaust dust arising in said car from the material of said bin so that the dust from the material of any bin will always be drawn off by its corresponding conduit section, means for exhausting air from said conduit, and a separate dust collector between each conduit section and said exhausting means for collecting the dust drawn off from the material of the corresponding bin.

11. The combination with a runway of a car arranged to travel on said runway, said car having a receiving opening for admitting material charged into said car and a discharge opening for discharge of material from said car and a suction head separate from said receiving and discharge openings, a suction conduit extending along said runway and having means for closing all sides thereof to exclude atmospheric air from said conduit, means for exhausting air from said conduit to produce a partial vacuum therein, said suction head having travelling connection with said conduit and having means thereon for displacing the closing means at one side of said conduit to establish connection between said suction head and said conduit for various positions of said car on said runway.

12. In a floatage collection device in combination a conduit having a continuous flexible closure lying flat against one side thereof, means for exhausting said conduit to produce a partial vacuum therein, means for preventing collapse of said flexible closure into said conduit under the differential pressure thereon due to said partial vacuum, and a head extending between said flexible closure and said conduit and having a passage therethrough to establish communication with the interior of said conduit for passage of contaminated air into said conduit, said head being movable along said conduit while maintaining communication with the interior thereof and while said flexible closure is drawn about said head by said differential pressure.

13. The combination with a travelling receptacle having a collection hood or canopy thereover, of means for collecting floatage arising from within said receptacle, said means comprising a conduit extending along the path of travel of said receptacle, a suction head connected with said hood and having travelling connection with said conduit and having a passage therethrough connecting said hood with said conduit and means for exhausting air from said conduit to draw floatage from the upper portion of said receptacle through said suction head into said conduit.

14. The combination with a travelling receptacle having a collection hood or canopy thereover, of means for collecting floatage arising from within said receptacle, said means comprising a conduit extending along the path of travel of said receptacle and having a flexible curtain for closing one side thereof, said curtain being attached to said conduit along one edge thereof and detached along the other edge thereof, a suction head connected with said hood and extending between said conduit and the detached edge of said curtain to provide a travelling connection with said conduit, said head having a passage therethrough connecting said hood with said conduit, and means for exhausting air from said conduit to draw floatage from the upper part of said receptacle, through said suction head, into said conduit.

ALBERT M. MORRIS.